(12) United States Patent
Smith

(10) Patent No.: US 10,421,502 B2
(45) Date of Patent: Sep. 24, 2019

(54) TAIL GATE SHROUD

(71) Applicant: INVENTIONS INCORPORATED, LLC, Huntsville, AL (US)

(72) Inventor: Timothy Smith, Huntsville, AL (US)

(73) Assignee: Inventions Incorporated LLC, Huntsville, AL (US)

( * ) Notice: Subject to any disclaimer, the term of this patent is extended or adjusted under 35 U.S.C. 154(b) by 0 days.

(21) Appl. No.: 15/888,311

(22) Filed: Feb. 5, 2018

(65) Prior Publication Data

US 2019/0241219 A1  Aug. 8, 2019

(51) Int. Cl.
*B62D 33/02* (2006.01)
*B62D 33/027* (2006.01)
*B62D 33/03* (2006.01)

(52) U.S. Cl.
CPC ......... *B62D 33/0273* (2013.01); *B62D 33/03* (2013.01)

(58) Field of Classification Search
CPC ............................ B62D 33/0273; B62D 33/03
USPC ...................................................... 296/57.1
See application file for complete search history.

(56) References Cited

U.S. PATENT DOCUMENTS

| | | | |
|---|---|---|---|
| 4,763,945 A | 8/1988 | Murray | |
| 5,188,415 A | 2/1993 | Wagner | |
| 5,904,391 A * | 5/1999 | Liljenquest | B62D 33/0273 296/57.1 |
| 6,474,654 B1 | 11/2002 | Schmeichel | |
| 6,540,278 B2 | 4/2003 | Presley | |
| 6,749,245 B1 | 6/2004 | Walker | |
| 7,052,070 B1 | 5/2006 | Simonin | |
| 7,547,055 B2 | 6/2009 | Stratten | |
| 8,459,716 B2 | 6/2013 | Kaplan | |
| 9,016,753 B2 | 4/2015 | McDermott, III | |
| 9,255,431 B2 | 2/2016 | Noh | |
| 9,316,044 B2 | 4/2016 | Hemphill | |
| 9,862,335 B2 * | 1/2018 | Vu | B60R 13/06 |
| 2005/0073167 A1 | 4/2005 | DeGaillard | |
| 2011/0080017 A1 | 4/2011 | Olson | |
| 2012/0223541 A1 * | 9/2012 | Gianino | B62D 33/0273 296/57.1 |
| 2016/0185396 A1 | 6/2016 | Castillo et al. | |
| 2016/0221515 A1 | 8/2016 | Burd et al. | |

* cited by examiner

*Primary Examiner* — Joseph D. Pape
(74) *Attorney, Agent, or Firm* — Daniel A. Thomson; Emerson Thomson Bennett, LLC

(57) ABSTRACT

A shroud for a truck bed tailgate may comprise a set of platens adapted for engagement with a pick-up truck having a truck bed, and a tailgate pivotable about a tailgate pivot axis. The set of platens may comprise multiple platens pivotably engaged to one another by multiple pivot shafts in order to form a four-bar linkage when assemble with a truck bed, and a tailgate.

20 Claims, 7 Drawing Sheets

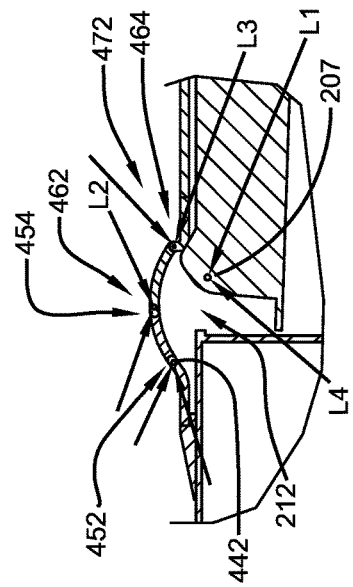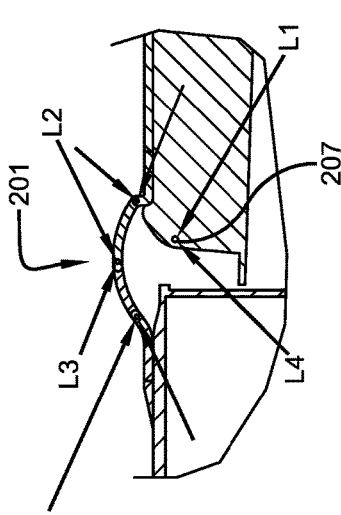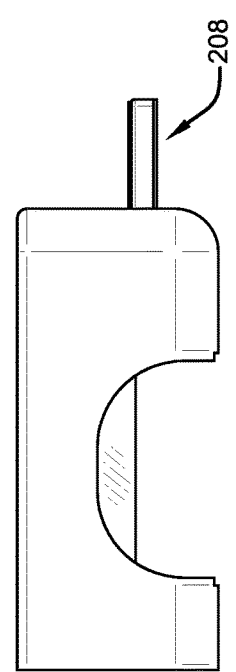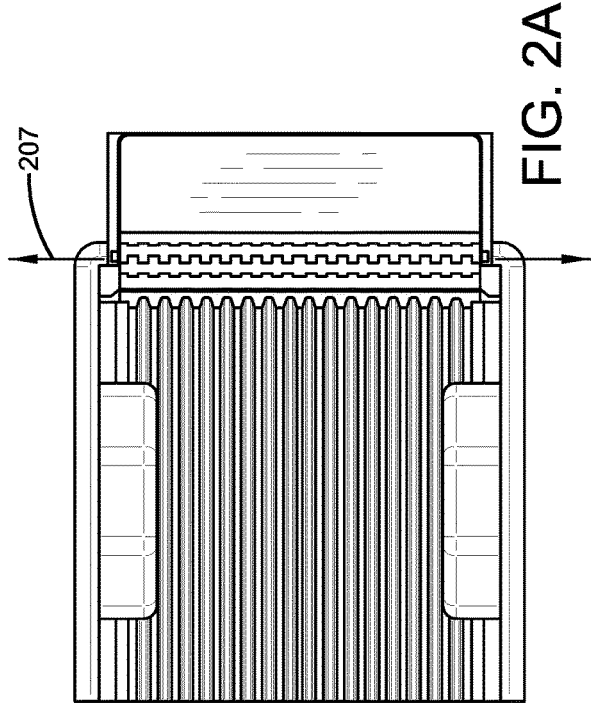

TAIL GATE SHROUD

I. BACKGROUND

The present subject matter is directed to truck tailgates. More specifically, the present technology is directed to apparatuses and methods for shrouding a gap between a tailgate and a truck bed.

A pick-up truck typically comprises a tailgate hingedly connected to a truck bed and adapted to be moved between a closed position and an open position. One common form of tailgate is substantially upright and latchable when closed and is substantially flat when open. Such common tailgates for a gap between the truck bed and the tailgate when the tailgate is in the open position.

It remains desirable to provide a substantially rigid shroud which is adapted to cover all or part of the tailgate gap and to adjust to accommodate the changeable position of the tailgate.

II. SUMMARY

Provided is a shroud for a truck bed tailgate comprising a set of platens adapted for engagement with pick-up truck having truck bed, and a tailgate pivotable about a tailgate pivot axis. The set of platens has a first platen defining a first pivot axis, the first platen being adapted to be fixedly engaged with the truck bed with the first pivot axis parallel to the tailgate pivot axis and offset from the tailgate pivot axis by a distance L1, and wherein the first platen defines a first surface; a second platen defining a second pivot axis and a third pivot axis parallel to the second pivot axis and offset from the second pivot axis by a distance L2, the second platen being adapted to be engaged to the first platen such that the second pivot axis and the first pivot axis coincide and the second platen is pivotable about first pivot axis, and wherein the second platen defines a second surface; a third platen defining a fourth pivot axis and a fifth pivot axis parallel to the fourth pivot axis and offset from the fourth pivot axis by a distance L3, the third platen being adapted to be engaged to the second platen such that the fourth pivot axis and the third pivot axis coincide and the third platen is pivotable about third pivot axis, and wherein the third platen defines a third surface; a fourth platen defining a sixth pivot axis, the fourth platen being adapted to be fixedly engaged with the tailgate with the sixth pivot axis parallel to the tailgate pivot axis and offset from the tailgate pivot axis by a distance L4 such that the fourth platen is pivotable about the tailgate pivot axis, the fourth platen further being adapted to be engaged to the third platen such that the sixth pivot axis and the fifth pivot axis coincide, the fourth platen being pivotable about the fifth pivot axis, and wherein the fourth platen defines a fourth surface; a first pivot shaft adapted to pivotably connect the first platen and the second platen along the coincident first pivot axis and second pivot axis; a second pivot shaft adapted to pivotably connect the second platen and the third platen along the coincident third pivot axis and fourth pivot axis; and a third pivot shaft adapted to pivotably connect the third platen and the fourth platen along the coincident fifth pivot axis and sixth pivot axis.

Still other benefits and advantages of the present subject matter will become apparent to those skilled in the art to which it pertains upon a reading and understanding of the following detailed specification.

III. BRIEF DESCRIPTION OF THE DRAWINGS

The present subject matter may take physical form in certain parts and arrangement of parts, embodiments of which will be described in detail in this specification and illustrated in the accompanying drawings which form a part hereof and wherein:

FIG. 2a is a top view of the first embodiment of a truck bed with a tailgate shroud with the tailgate in an open position.

FIG. 2b is a side view of the first embodiment of a truck bed with a tailgate shroud with the tailgate in an open position.

FIG. 2c is section view A-A of the first embodiment of a truck bed with a tailgate shroud with the tailgate in an open position.

FIG. 2d is section view B-B of the first embodiment of a truck bed with a tailgate shroud with the tailgate in an open position.

IV. DETAILED DESCRIPTION

Figure 1:
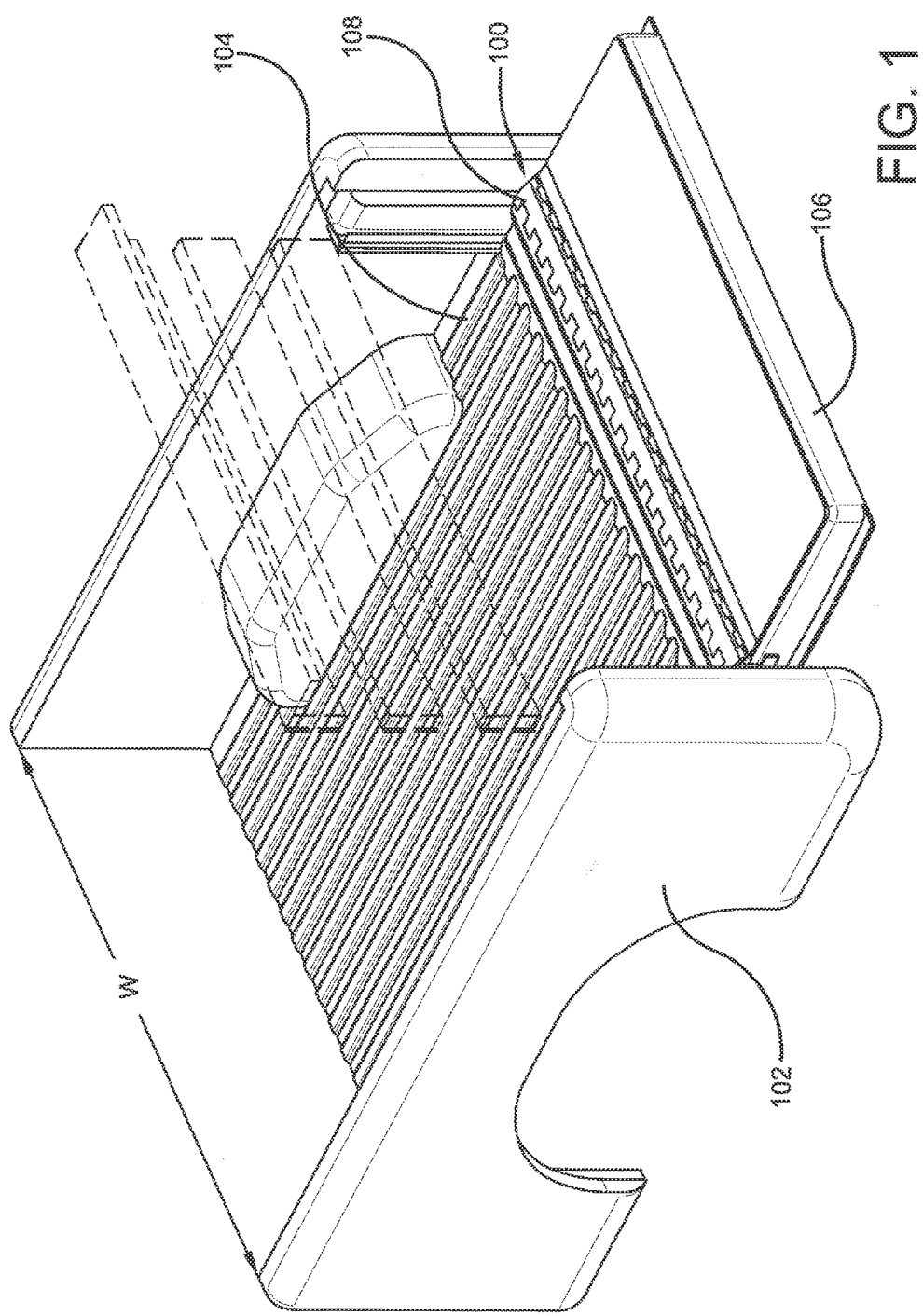
FIG. 1 is an axonometric view of a first embodiment of a truck bed with a tailgate shroud.

Referring now to the drawings wherein the showings are for purposes of illustrating embodiments of the present subject matter only and not for purposes of limiting the same, and wherein like reference numerals are understood to refer to like components, provided is a tailgate shroud.

Figure 3C:
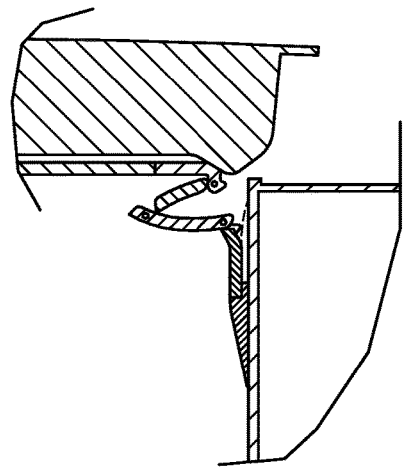
FIG. 3c is section view A-A of the first embodiment of a truck bed with a tailgate shroud with the tailgate in a closed position.
Figure 3D:
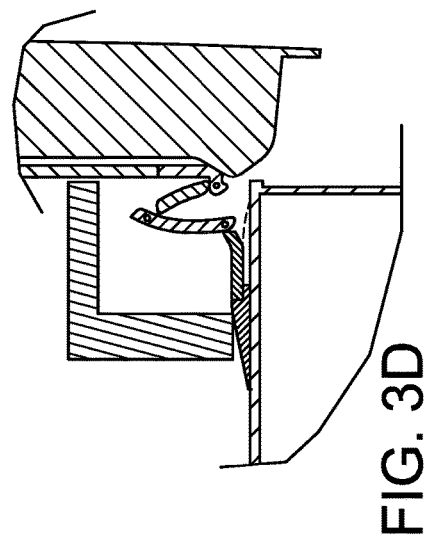
FIG. 3d is section view B-B of the first embodiment of a truck bed with a tailgate shroud with the tailgate in a closed position.
Figure 3A:
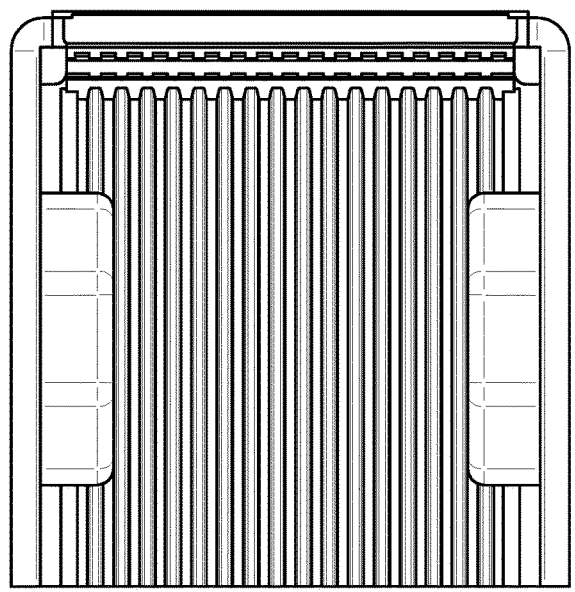
FIG. 3a is a top view of the first embodiment of a truck bed with a tailgate shroud with the tailgate in a closed position.
Figure 3B:
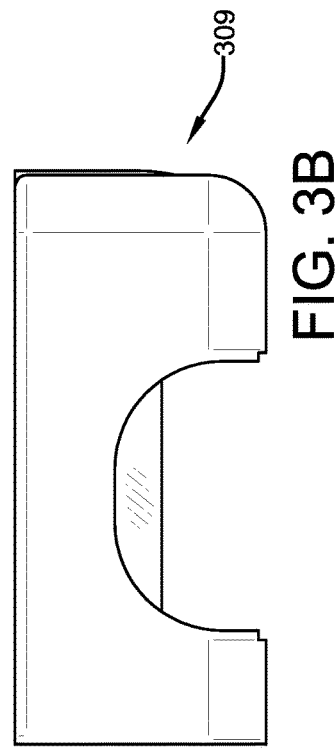
FIG. 3b is a side view of the first embodiment of a truck bed with a tailgate shroud with the tailgate in a closed position.
Figure 4:
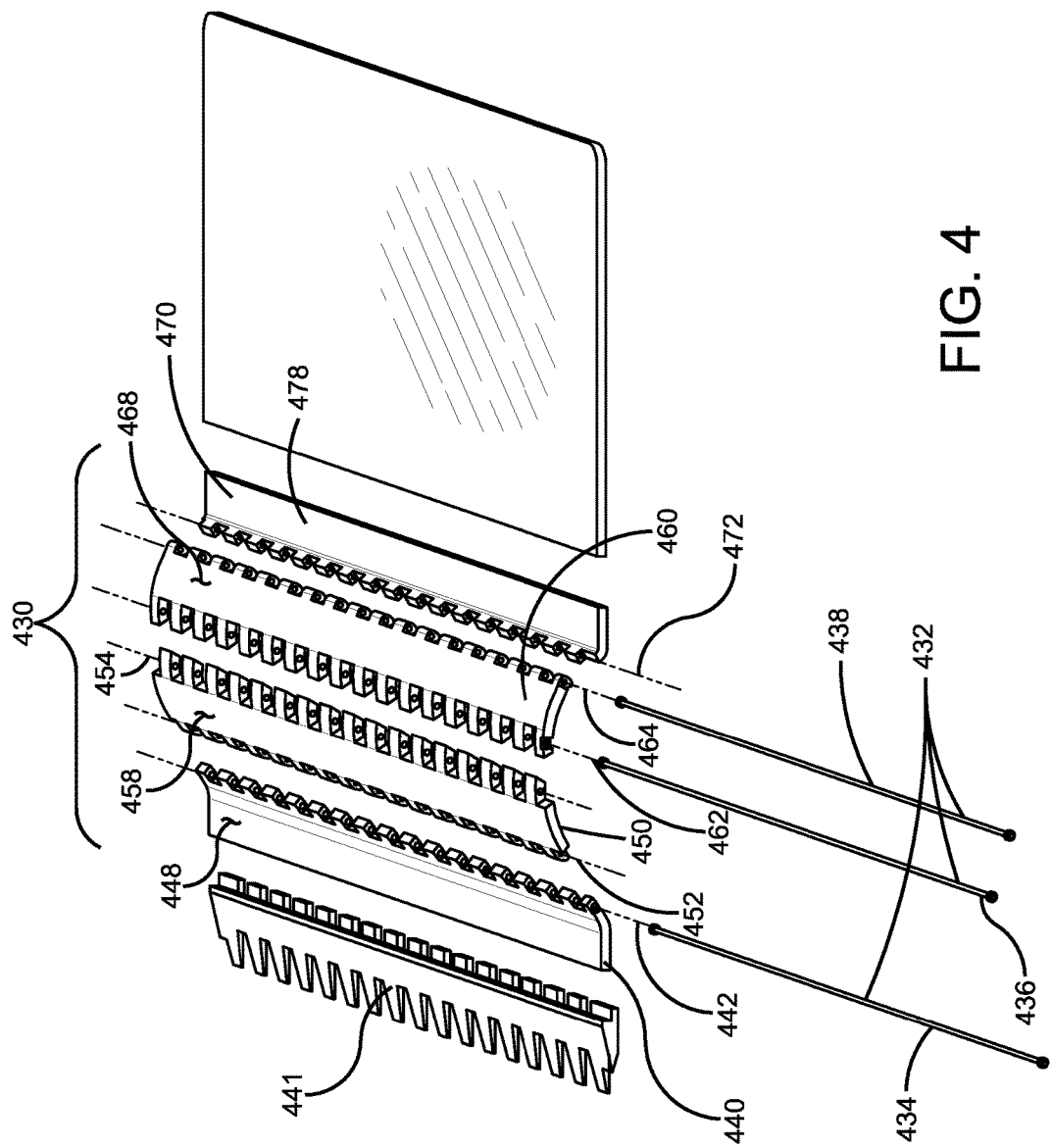
FIG. 4 is an view of the unassembled components that are part of one embodiment of a four bar mechanism for the first embodiment of a tailgate shroud.

In the non limiting embodiment shown in FIGS. 1-4, a tailgate shroud 100 for a truck bed tailgate may comprise a set of platens 430 adapted for engagement as a four-bar linkage 108 with an associated pick-up truck 102. The associated pick-up truck 102 has a truck bed 104 of some width W, and a tailgate 106 engaged with the truck bed 104 to pivot about a tailgate pivot axis 207 continuously between an open position 208, and a closed position 309. When the tailgate 106 is in the open position 208, an elongated tailgate clearance gap 212 is formed extending parallel to the tailgate pivot axis 207.

The set of platens 430 may comprise a first platen 440, a second platen 450, third platen 460, and a fourth platen 470. The set of platens may be engaged with a truck bed 104, a tailgate 106, and to one another to form a four bar linkage 108 operable to shroud the tailgate gap 212 as shown in FIGS. 2c and 2d. In some embodiments, the set of platens may be pivotably engaged to one another by a set of pivot shafts 432.

The first platen 440 may define a first pivot axis 442, the first platen 440 being adapted to be fixedly engaged with the truck bed 104 with the first pivot axis 442 parallel to the tailgate pivot axis 207 and offset from the tailgate pivot axis 207 by a distance L1. The first platen 440 may define a first surface 448.

The second platen 450 may define a second pivot axis 452 and a third pivot axis 454 parallel to the second pivot axis 452 and offset from the second pivot axis 452 by a distance L2. The second platen 450 may be engaged or may be adapted to be engaged to the first platen 440 such that the second pivot axis 452 and the first pivot axis 442 coincide and the second platen 450 is pivotable about first pivot axis 442. The second platen may define a second surface 458

The third platen 460 may define a fourth pivot axis 462 and a fifth pivot axis 464 parallel to the fourth pivot axis 462 and offset from the fourth pivot axis 462 by a distance L3. The third platen 460 being adapted to be engaged to the second platen 450 such that the fourth pivot axis 462 and the third pivot axis 454 coincide and the third platen 460 is pivotable about third pivot axis 454. The third platen 460 may define a third surface 468.

The fourth platen 470 may define a sixth pivot axis 472, the fourth platen 470 fixedly engaged or being adapted to be fixedly engaged with the tailgate 106 with the sixth pivot axis 472 parallel to the tailgate pivot axis 207 and offset from the tailgate pivot axis 207 by a distance L4. The fourth platen 470 may be engaged or may be adapted to be engaged to the third platen 460 such that the sixth pivot axis 472 and the fifth pivot axis 464 coincide with the fourth platen 470 being pivotable about the fifth pivot axis 464 as well as being pivotable about the tailgate pivot axis 207. The fourth platen 470 may define a fourth surface 478. It should be understood that the distances L1, L2, L3, and L4 each define the length of the respective links. Accordingly, herein, unless otherwise noted: length L1 is interchangeable with distance L1 length L2 is interchangeable with distance L2, length L3 is interchangeable with distance L3, and length L4 is interchangeable with distance L4. These lengths L1, L2, L3, and L4 are shown with pairs of external dimension lines in FIGS. 2C and 2D.

When engaged to form a four bar linkage 108, the linkage performance is a function of the link lengths, L1, L2, L3, L4. For analysis purposes it should be understood that the links can be ordered from shortest link, S, to longest link L, where there other two links are of intermediate length P and Q. For analysis purposes where one of more links are of the same length they can be interchangeably assigned their order in the ordered from shortest link, S, to longest link L such that there is always a shortest link of length S and a longest link of length L, and two links are of intermediate length P and Q. Four bar linkages may be analyzed to determine whether or not they satisfy the Grashof condition. The Grashof condition for a four-bar linkage states: if the sum of the shortest and longest link of a planar quadrilateral linkage is less than or equal to the sum of the remaining two links, then the shortest link can rotate fully with respect to a neighboring link. That is, the Grashof condition is satisfied if S+L≤P+Q. In some embodiments, the linkage 108 does not satisfy the Grashof condition.

It should be understood that, unless otherwise noted, ranges recited herein are not inclusive of their recited endpoints.

In some embodiments, the tailgate closed position 309 is a 90 degree rotation about the tailgate pivot axis 207 from the tailgate open position 208. It is acceptable in some embodiments that the tailgate closed position 309 is a .gamma. degree rotation about the tailgate pivot axis 207 from the tailgate open position 208, where .gamma. is between 45 and 180 degrees, or where .gamma. is between 75 and 105 degrees, or where .gamma. is between 85 and 95 degrees.

In some embodiments, the relationship of the lengths of the link lengths, L1, L2, L3, and L4 is such that L1+L3−L2−L4 is positive; L1+L4−L2−L3 is positive; and L3+L4−L2−L1 is negative. In such an embodiment, the input link, the link with length L2 may be a 0-Rocker and the output link, the link with length L4, may be a it-Rocker.

In some embodiments the relationship of the lengths of the link lengths, L1, L2, L3, and L4 is such that L2/L1 is between 0.6 and 0.8; and L3/L1 is between 0.6 and 0.8; and L4/L1 is between 0.6 and 0.8. In some embodiments the relationship of the lengths of the link lengths, L1, L2, L3, and L4 is such that L2/L1 is between 0.65 and 0.75 inclusive; and L3/L1 is between 0.65 and 0.75 inclusive; and L4/L1 is between 0.65 and 0.75 inclusive. In some embodiments the relationship of the lengths of the link lengths, L1, L2, L3, and L4 is such that L2/L1 is between 0.68 and 0.72 inclusive; L3/L1 is between 0.68 and 0.72 inclusive; and L4/L1 is between 0.68 and 0.72 inclusive.

In some embodiments the linkage 108 is such that when the tailgate 106 is in the open position 208, the first surface 448, the surface 458, and the third surface 468 form a continuous smooth surface 201. As used herein the term smooth continuous smooth surface refers to a surface that lack discontinuities, the slope of the surface 201 (as measured in a cross section perpendicular to the tailgate pivot axis as shown in FIGS. 2c and 2d) is the same or substantially the same as measured on either side of any given point.

In some embodiments, the first platen is elongated to extend at least a width of 0.9 W in a direction parallel to the tailgate pivot axis 207. In some embodiments, the second platen is elongated to extend at least a width of 0.9 W in a direction parallel to the tailgate pivot axis 207. In some embodiments, the third platen is elongated to extend at least a width of 0.9 W in a direction parallel to the tailgate pivot axis 207. In some embodiments, the forth platen is elongated to extend at least a width of 0.9 W in a direction parallel to the tailgate pivot axis 207. In some embodiments, each platen is elongated to extend at least a width of 0.9 W in a direction parallel to the tailgate pivot axis 207.

As shown in FIGS. 1-4 in one non limiting embodiment a linkage 108 may be formed. The first platen 440 may be fixedly engaged to a truck bed 104 either directly or by engagement to an intermediate platen 441. The truck bed 104 is pivotably connected to a tailgate 106 along a tailgate pivot axis 207. The first platen 440 is pivotably engaged to the second platen 450 by a first pivot shaft 434 extending along coincident axes 442 and 452. The second platen 450 is pivotably engaged to the third platen 460 by a second pivot shaft 436 extending along coincident axes 454 and 462. The third platen 460 is pivotably engaged to the fourth platen 470 by a third pivot shaft 438 extending along coincident axes 464 and 472. The fourth platen 470 may be fixedly engaged to the tailgate 106 and may be pivotable with the tailgate 106 about the tailgate pivot axis 207. The linkage 108 may be considered to have a ground link of length L1 extending between the first pivot shaft 434 and the tailgate pivot axis 207; an input link of length L2 extending between the first pivot shaft 434 and the second pivot shaft 436; a coupler link of length L3 extending between the second pivot shaft 436 and the third pivot shaft 438; and an output link of length L4 extending between the third pivot shaft 438 and the tailgate pivot axis 207.

Figure 5:
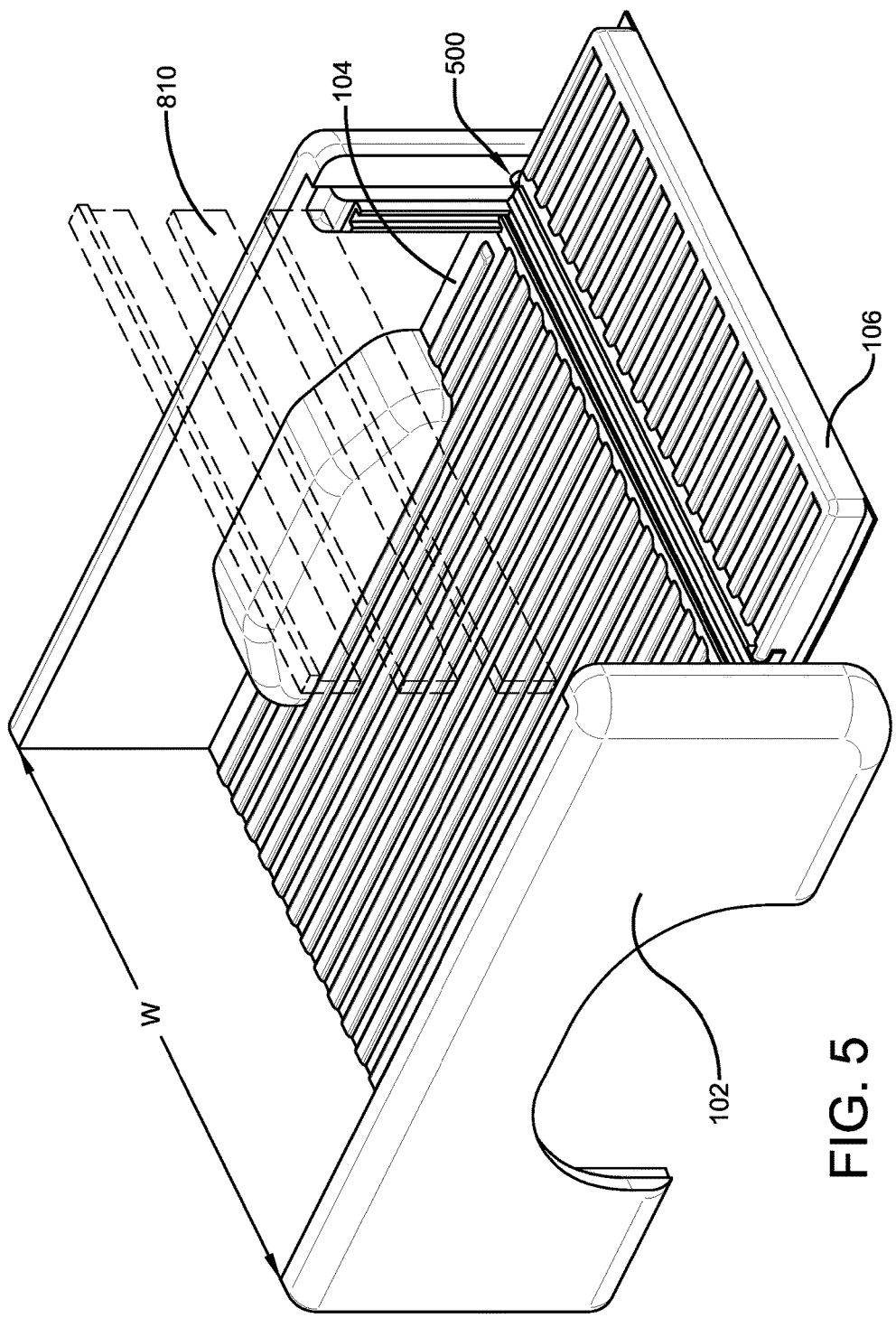
FIG. 5 is an axonometric view of a second embodiment of a truck bed with a tailgate shroud.
Figure 6C:
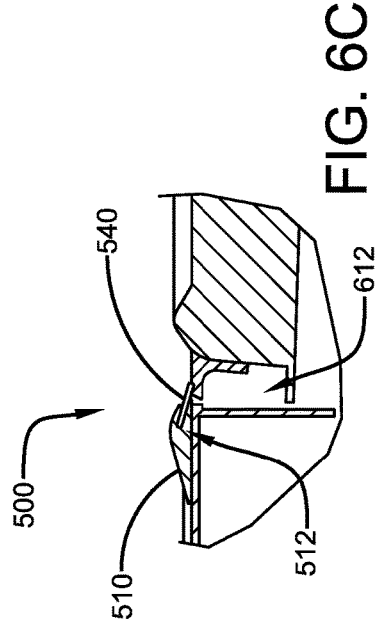
FIG. 6c is section view A-A of the second embodiment of a truck bed with a tailgate shroud with the tailgate in an open position.
Figure 6D:
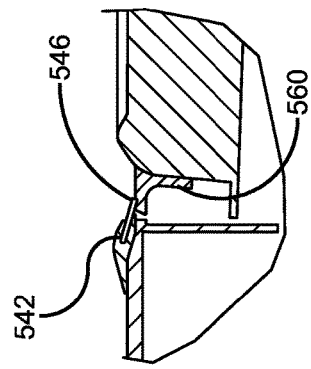
FIG. 6d is section view B-B of the second embodiment of a truck bed with a tailgate shroud with the tailgate in an open position.
Figure 6A:
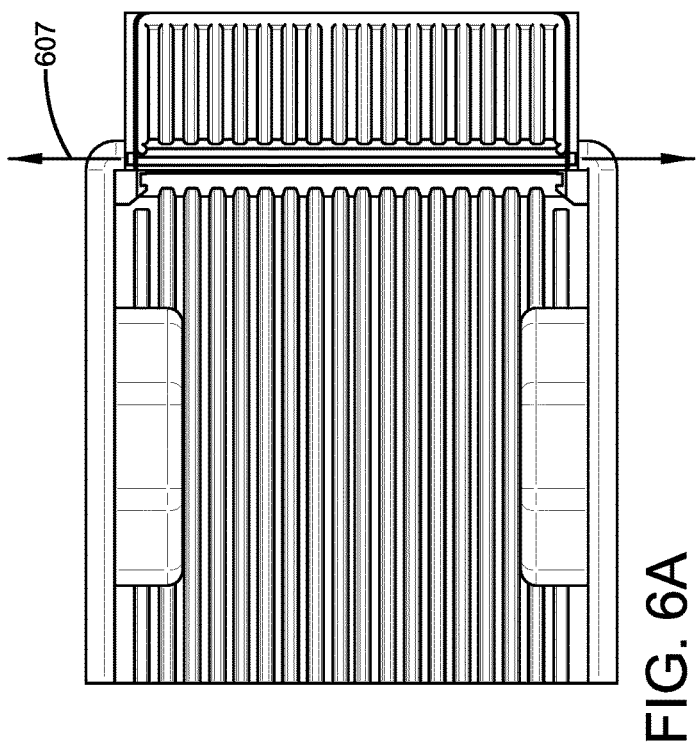
FIG. 6a is a top view of the second embodiment of a truck bed with a tailgate shroud with the tailgate in an open position.
Figure 6B:
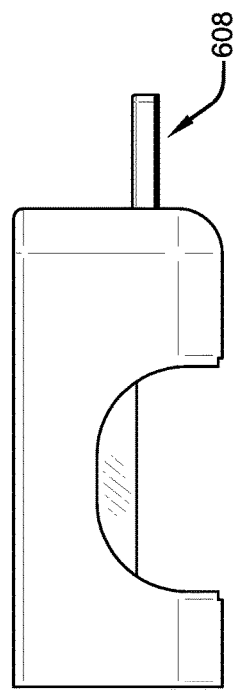
FIG. 6b is a side view of the second embodiment of a truck bed with a tailgate shroud with the tailgate in an open position.
Figure 7C:
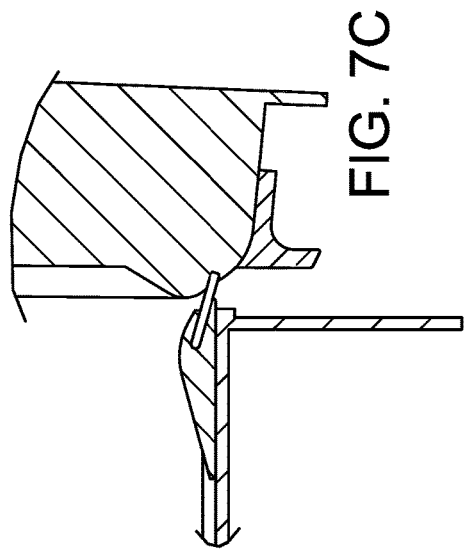
FIG. 7c is section view A-A of the second embodiment of a truck bed with a tailgate shroud with the tailgate in a closed position.
Figure 7D:
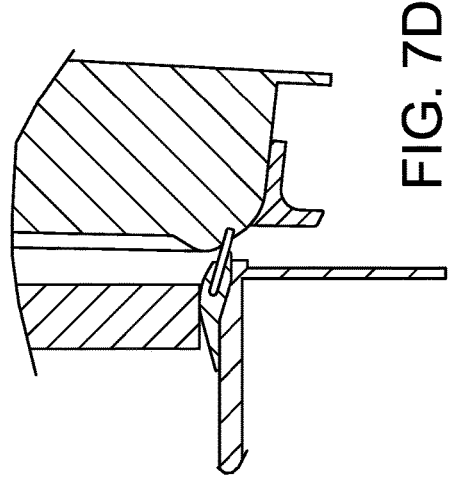
FIG. 7d is section view B-B of the second embodiment of a truck bed with a tailgate shroud with the tailgate in a closed position.
Figure 7A:
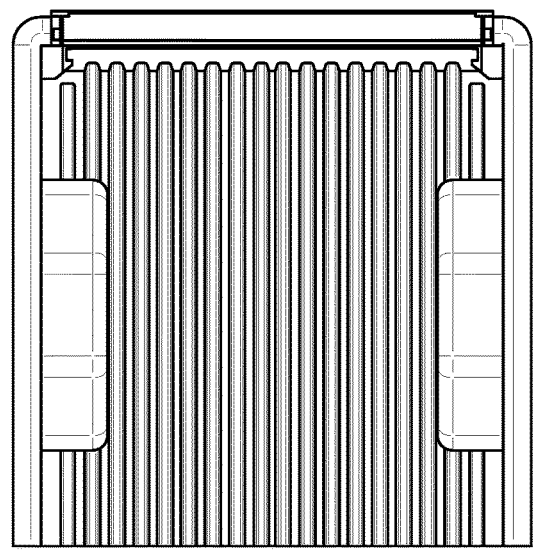
FIG. 7a is a top view of the second embodiment of a truck bed with a tailgate shroud with the tailgate in a closed position.
Figure 7B:
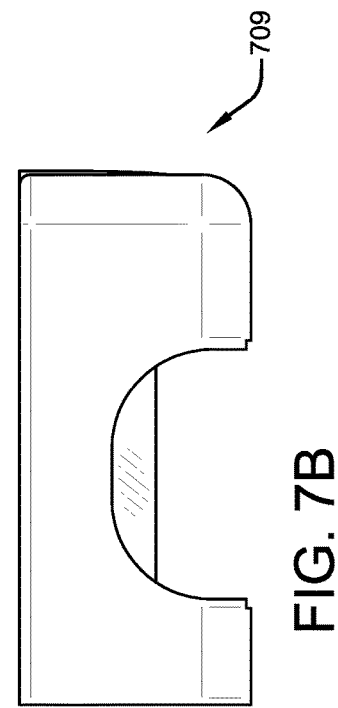
FIG. 7b is a side view of the second embodiment of a truck bed with a tailgate shroud with the tailgate in a closed position.

In the non limiting embodiment shown in FIGS. 5-7d, a tailgate shroud 500 for a truck bed tailgate may comprise an elastomeric strap 540 adapted for engagement with an associated pick-up truck 102. The associated pick-up truck 102 has a truck bed 104 of some width W, and a tailgate 106 engaged with the truck bed 104 to pivot about a tailgate pivot axis 607 continuously between an open position 608, and a closed position 709. When the tailgate 106 is in the open position 608, an elongated tailgate clearance gap 612 is formed extending parallel to the tailgate pivot axis 607.

In one non-limiting embodiment the tailgate shroud 500 may comprise a first rigid platen 510, an elastomeric strap 540, and a second rigid platen 560. The first rigid platen 510 may be fixedly engaged with the truck bed 104 and may be adapted to operationally engage the elastomeric strap 540. In one non-limiting embodiment, the elastomeric strap 540 has a first edge 542 and a second edge 546 which is free to flex with respect to the first edge 542 as the elastomeric material of the strap 540 flexes. In one non-limiting embodiment, the second rigid platen 560 may be fixedly engaged with the tailgate 106 and may be adapted to operationally engage the elastomeric strap 540.

In the non limiting embodiment shown in FIGS. 5-7d, the first rigid platen 510 provides a surface, or cavity, or other receptacle 512 elongated and extending parallel to the tailgate pivot axis 607. The receptacle 512 is fixedly engaged with the truck bed 104 and the receptacle 512 is adapted to receive and hold the first edge 542 of elastomeric strap 540 while permitting the second edge 546 of the elastomeric strap 540 to be free to flex with respect to the first edge 542 of elastomeric strap 540. The second edge 546 of the elastomeric strap 540 is movable with respect to both the first edge 542 of elastomeric strap 540 and to the second rigid platen 560. When the tailgate 106 is in the open position 608, the second edge 546 of the elastomeric strap 540 extends from the first rigid platen 510 across the tailgate clearance gap 612 to the second rigid platen 560, thereby closing the tailgate clearance gap 612. When the tailgate 106 is moved between the open position 608 and the closed position 709 the elastomeric strap 540 flexes sufficiently to provide freedom of motion without harm to the functionality of the tailgate shroud 500 or the associated pick-up truck 102.

As shown in FIGS. 1-7d, a tailgate shroud may be used in conjunction with one or more removable panels 810.

Further examples consistent with the present subject matter are set out in the following numbered clauses.

Clause 1. A shroud for a truck bed tailgate comprising a set of platens adapted for engagement as a four-bar linkage with an associated pick-up truck wherein the associated pick-up truck has a truck bed of some width W, a tailgate engaged with the truck bed to pivot about a tailgate pivot axis between an open position, and a closed position, and when the tailgate is in the open position, an elongated tailgate clearance gap extending parallel to the tailgate pivot axis; and wherein the set of platens has a first platen defining a first pivot axis, the first platen being adapted to be fixedly engaged with the truck bed with the first pivot axis parallel to the tailgate pivot axis and offset from the tailgate pivot axis by a distance L1, and wherein the first platen defines a first surface; a second platen defining a second pivot axis and a third pivot axis parallel to the second pivot axis and offset from the second pivot axis by a distance L2, the second platen being adapted to be engaged to the first platen such that the second pivot axis and the first pivot axis coincide and the second platen is pivotable about first pivot axis, and wherein the second platen defines a second surface; a third platen defining a fourth pivot axis and a fifth pivot axis parallel to the fourth pivot axis and offset from the fourth pivot axis by a distance L3, the third platen being adapted to be engaged to the second platen such that the fourth pivot axis and the third pivot axis coincide and the third platen is pivotable about third pivot axis, and wherein the third platen defines a third surface; a fourth platen defining a sixth pivot axis, the fourth platen being adapted to be fixedly engaged with the tailgate with the sixth pivot axis parallel to the tailgate pivot axis and offset from the tailgate pivot axis by a distance L4 such that the fourth platen is pivotable about the tailgate pivot axis, the fourth platen further being adapted to be engaged to the third platen such that the sixth pivot axis and the fifth pivot axis coincide, the fourth platen being pivotable about the fifth pivot axis, and wherein the fourth platen defines a fourth surface; a first pivot shaft adapted to pivotably connect the first platen and the second platen along the coincident first pivot axis and second pivot axis; a second pivot shaft adapted to pivotably connect the second platen and the third platen along the coincident third pivot axis and fourth pivot axis; and a third pivot shaft adapted to pivotably connect the third platen and the fourth platen along the coincident fifth pivot axis and sixth pivot axis.

Clause 2. A shrouded truck bed tailgate comprising a truck bed; a tailgate operationally engaged with the truck bed to be pivotable about a tailgate pivot axis between an open position, and a closed position, and a four bar linkage having a ground link defined by the tailgate pivot axis, and a first pivot axis, fixedly engaged to the truck bed, extending parallel to the tailgate pivot axis, and offset from the tailgate pivot axis by a distance L1; an input link defined by a second platen having a second pivot axis and a third pivot axis parallel to the second pivot axis and offset from the second pivot axis by a distance L2, pivotably connected to the ground link by a first pivot shaft to pivot about the first pivot axis such that the first pivot axis and the second pivot axis coincide, and wherein the second platen defines a second surface; a coupler link defined by a third platen having a fourth pivot axis and a fifth pivot axis parallel to the fourth pivot axis and offset from the fourth pivot axis by a distance L3, pivotably connected to the input link by a second pivot shaft to pivot about the third pivot axis such that the third pivot axis and the fourth pivot axis coincide, and wherein the third platen defines a third surface; an output link defined by a fourth platen having a sixth pivot axis parallel to the tailgate pivot axis and offset from the tailgate pivot axis by a distance L4, pivotably connected to the coupler link by a third pivot shaft to pivot about the fifth pivot axis such that the sixth pivot axis and the fifth pivot axis coincide, fixedly engaged to the tailgate to be pivotable with the tailgate about the tailgate pivot axis between the open position, and the closed position, and wherein the fourth platen defines a fourth surface.

Clause 3. A shrouded truck bed tailgate comprising a truck bed; a tailgate operationally engaged with the truck bed to be pivotable about a tailgate pivot axis between an open position, and a closed position, wherein closed position is a 90 degree rotation about the tailgate pivot axis from the open position; and a non-Grashof four bar linkage having a ground link defined by the tailgate pivot axis, and a first pivot axis, fixedly engaged to the truck bed, extending parallel to the tailgate pivot axis, and offset from the tailgate pivot axis by a distance L1, an input link defined by a second platen having a second pivot axis and a third pivot axis parallel to the second pivot axis and offset from the second pivot axis by a distance L2, pivotably connected to the ground link by a first pivot shaft to pivot about the first pivot axis such that the first pivot axis and the second pivot axis coincide, and wherein the second platen defines a second surface, a coupler link defined by a third platen having a fourth pivot axis and a fifth pivot axis parallel to the fourth pivot axis and offset from the fourth pivot axis by a distance L3, pivotably connected to the input link by a second pivot shaft to pivot about the third pivot axis such that the third pivot axis and the fourth pivot axis coincide, and wherein the third platen defines a third surface, and an output link defined by a fourth platen having a sixth pivot axis parallel to the tailgate pivot axis and offset from the tailgate pivot axis by a distance L4, pivotably connected to the coupler link by a third pivot shaft to pivot about the fifth pivot axis such that the sixth pivot axis and the fifth pivot axis coincide, fixedly engaged to the tailgate to be pivotable with the tailgate about the tailgate pivot axis between the open position, and the closed position, and wherein the fourth platen defines a fourth surface; and wherein the relationship of the lengths of the link lengths, L1, L2, L3, and L4 is such that L1+L3−L2−L4 is positive, L1+L4−L2−L3 is positive, and L3+L4−L2−L1 is negative; wherein L2/L1 is between 0.68 and 0.72 inclusive, L3/L1 is between 0.68 and 0.72 inclusive, and L4/L1 is between 0.68 and 0.72 inclusive; and wherein each platen is elongated to extend at least a width of 0.9 W in a direction parallel to the tailgate pivot axis.

Non-limiting embodiments have been described, hereinabove. It will be apparent to those skilled in the art that the above methods and apparatuses may incorporate changes and modifications without departing from the general scope of the present subject matter. It is intended to include all such modifications and alterations in so far as they come within the scope of the appended claims or the equivalents thereof.

What is claimed is:

1. A shroud for a truck bed tailgate comprising
  a set of platens adapted for engagement as a four-bar linkage with an associated pick-up truck
  wherein the associated pick-up truck has
    a truck bed of some width W,
    a tailgate engaged with the truck bed to pivot about a tailgate pivot axis between
      an open position, and
      a closed position, and
      when the tailgate is in the open position, an elongated tailgate clearance gap between the truck bed and the tailgate extending parallel to the tailgate pivot axis; and
  wherein the set of platens has
    a first platen defining a first pivot axis,
      the first platen being adapted to be fixedly engaged with the truck bed with the first pivot axis parallel to the tailgate pivot axis and offset from the tailgate pivot axis by a distance L1, and
      wherein the first platen defines a first surface;
    a second platen defining a second pivot axis and a third pivot axis parallel to the second pivot axis and offset from the second pivot axis by a distance L2,
      the second platen being adapted to be engaged to the first platen such that the second pivot axis and the first pivot axis coincide and the second platen is pivotable about the first pivot axis, and wherein the second platen defines a second surface;
    a third platen defining a fourth pivot axis and a fifth pivot axis parallel to the fourth pivot axis and offset from the fourth pivot axis by a distance L3,
      the third platen being adapted to be engaged to the second platen such that the fourth pivot axis and the third pivot axis coincide and the third platen is pivotable about the third pivot axis, and wherein the third platen defines a third surface;
    a fourth platen defining a sixth pivot axis,
      the fourth platen being adapted to be fixedly engaged with the tailgate with the sixth pivot axis parallel to the tailgate pivot axis and offset from the tailgate pivot axis by a distance L4 such that the fourth platen is pivotable about the tailgate pivot axis,
      the fourth platen further being adapted to be engaged to the third platen such that the sixth pivot axis and the fifth pivot axis coincide,
      the fourth platen being pivotable about the fifth pivot axis, and wherein the fourth platen defines a fourth surface;
    a first pivot shaft adapted to pivotably connect the first platen and the second platen along the coincident first pivot axis and second pivot axis;
    a second pivot shaft adapted to pivotably connect the second platen and the third platen along the coincident third pivot axis and fourth pivot axis; and
    a third pivot shaft adapted to pivotably connect the third platen and the fourth platen along the coincident fifth pivot axis and sixth pivot axis.

2. The shroud for a truck bed tailgate of claim 1, wherein tailgate closed position is a 90 degree rotation about the tailgate pivot axis from the tailgate open position.

3. The shroud for a truck bed tailgate of claim 2, wherein the four-bar linkage does not satisfy the Grashof condition.

4. The shroud for a truck bed tailgate of claim 3, wherein the relationship of the lengths of the link lengths, L1, L2, L3, and L4 is such that
  L1+L3−L2−L4 is positive;
  L1+L4−L2−L3 is positive; and
  L3+L4−L2−L1 is negative.

5. The shroud for a truck bed tailgate of claim 4, wherein
  L2/L1 is between 0.6 and 0.8;
  L3/L1 is between 0.6 and 0.8; and
  L4/L1 is between 0.6 and 0.8.

6. The shroud for a truck bed tailgate of claim 5, wherein
  L2/L1 is between 0.65 and 0.75 inclusive;
  L3/L1 is between 0.65 and 0.75 inclusive; and
  L4/L1 is between 0.65 and 0.75 inclusive.

7. The shroud for a truck bed tailgate of claim 6, wherein
  L2/L1 is between 0.68 and 0.72 inclusive;
  L3/L1 is between 0.68 and 0.72 inclusive; and
  L4/L1 is between 0.68 and 0.72 inclusive.

8. The shroud for a truck bed tailgate of claim 7, wherein, when the tailgate is in the open position, the second surface, the third surface, and the fourth surface form a continuous smooth surface.

9. The shroud for a truck bed tailgate of claim 8, wherein the first platen is elongated to extend at least a width of 0.9 W in a direction parallel to the tailgate pivot axis.

10. The shroud for a truck bed tailgate of claim 9, wherein each platen is elongated to extend at least a width of 0.9 W in a direction parallel to the tailgate pivot axis.

11. A shrouded truck bed tailgate comprising
a truck bed;
a tailgate operationally engaged with the truck bed to be
pivotable about a tailgate pivot axis between
an open position, and
a closed position, and
a four bar linkage having
a ground link defined by
the tailgate pivot axis, and
a first pivot axis,
fixedly engaged to the truck bed,
extending parallel to the tailgate pivot axis, and
offset from the tailgate pivot axis by a distance L1;
an input link
defined by a second platen having a second pivot axis and a third pivot axis parallel to the second pivot axis and offset from the second pivot axis by a distance L2,
pivotably connected to the ground link by a first pivot shaft to pivot about the first pivot axis such that the first pivot axis and the second pivot axis coincide, and
wherein the second platen defines a second surface;
a coupler link
defined by a third platen having a fourth pivot axis and a fifth pivot axis parallel to the fourth pivot axis and offset from the fourth pivot axis by a distance L3,
pivotably connected to the input link by a second pivot shaft to pivot about the third pivot axis such that the third pivot axis and the fourth pivot axis coincide, and
wherein the third platen defines a third surface;
an output link
defined by a fourth platen having a sixth pivot axis parallel to the tailgate pivot axis and offset from the tailgate pivot axis by a distance L4,
pivotably connected to the coupler link by a third pivot shaft to pivot about the fifth pivot axis such that the sixth pivot axis and the fifth pivot axis coincide,
fixedly engaged to the tailgate to be pivotable with the tailgate about the tailgate pivot axis between the open position, and the closed position, and
wherein the fourth platen defines a fourth surface.

12. The shrouded truck bed tailgate of claim 11, wherein tailgate closed position is a 90 degree rotation about the tailgate pivot axis from the tailgate open position.

13. The shrouded truck bed tailgate of claim 12, wherein the four-bar linkage does not satisfy the Grashof condition.

14. The shrouded truck bed tailgate of claim 13, wherein the relationship of the lengths of the link lengths, L1, L2, L3, and L4 is such that
L1+L3−L2−L4 is positive;
L1+L4−L2−L3 is positive; and
L3+L4−L2−L1 is negative.

15. The shrouded truck bed tailgate of claim 14, wherein
L2/L1 is between 0.6 and 0.8;
L3/L1 is between 0.6 and 0.8; and
L4/L1 is between 0.6 and 0.8.

16. The shrouded truck bed tailgate of claim 15, wherein
L2/L1 is between 0.65 and 0.75 inclusive;
L3/L1 is between 0.65 and 0.75 inclusive; and
L4/L1 is between 0.65 and 0.75 inclusive.

17. The shrouded truck bed tailgate of claim 16, wherein
L2/L1 is between 0.68 and 0.72 inclusive;
L3/L1 is between 0.68 and 0.72 inclusive; and
L4/L1 is between 0.68 and 0.72 inclusive.

18. The shrouded truck bed tailgate of claim 17, wherein, when the tailgate is in the open position, the second surface, the third surface, and the fourth surface form a continuous smooth surface.

19. The shrouded truck bed tailgate of claim 18, wherein each platen is elongated to extend at least a width of 0.9 W in a direction parallel to the tailgate pivot axis.

20. A shrouded truck bed tailgate comprising
a truck bed;
a tailgate operationally engaged with the truck bed to be
pivotable about a tailgate pivot axis between
an open position, and
a closed position, wherein closed position is a 90 degree rotation about the tailgate pivot axis from the open position; and
a non-Grashof four bar linkage having
a ground link defined by
the tailgate pivot axis, and
a first pivot axis,
fixedly engaged to the truck bed,
extending parallel to the tailgate pivot axis, and
offset from the tailgate pivot axis by a distance L1,
an input link
defined by a second platen having a second pivot axis and a third pivot axis parallel to the second pivot axis and offset from the second pivot axis by a distance L2,
pivotably connected to the ground link by a first pivot shaft to pivot about the first pivot axis such that the first pivot axis and the second pivot axis coincide, and
wherein the second platen defines a second surface,
a coupler link
defined by a third platen having a fourth pivot axis and a fifth pivot axis parallel to the fourth pivot axis and offset from the fourth pivot axis by a distance L3,
pivotably connected to the input link by a second pivot shaft to pivot about the third pivot axis such that the third pivot axis and the fourth pivot axis coincide, and
wherein the third platen defines a third surface, and
an output link
defined by a fourth platen having a sixth pivot axis parallel to the tailgate pivot axis and offset from the tailgate pivot axis by a distance L4,
pivotably connected to the coupler link by a third pivot shaft to pivot about the fifth pivot axis such that the sixth pivot axis and the fifth pivot axis coincide,
fixedly engaged to the tailgate to be pivotable with the tailgate about the tailgate pivot axis between the open position, and the closed position, and
wherein the fourth platen defines a fourth surface;
and wherein the relationship of the lengths of the link lengths,
L1, L2, L3, and L4 is such that
L1+L3−L2−L4 is positive,
L1+L4−L2−L3 is positive, and
L3+L4−L2−L1 is negative;
wherein
L2/L1 is between 0.68 and 0.72 inclusive,
L3/L1 is between 0.68 and 0.72 inclusive, and
L4/L1 is between 0.68 and 0.72 inclusive; and
wherein each platen is elongated to extend at least a width of 0.9 W in a direction parallel to the tailgate pivot axis.

* * * * *